Aug. 28, 1934.  S. H. PETERSEN ET AL  1,971,382
MULTIPLE VALVE CONTROL
Filed March 5, 1932  2 Sheets-Sheet 2
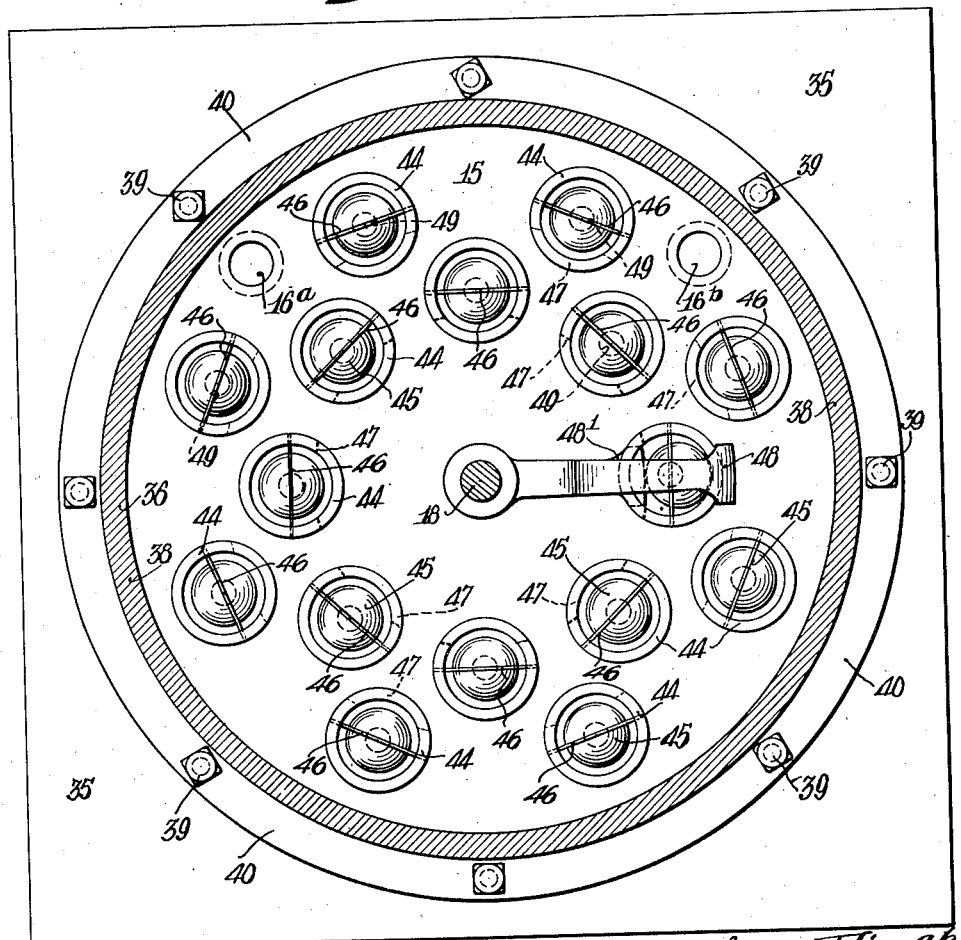

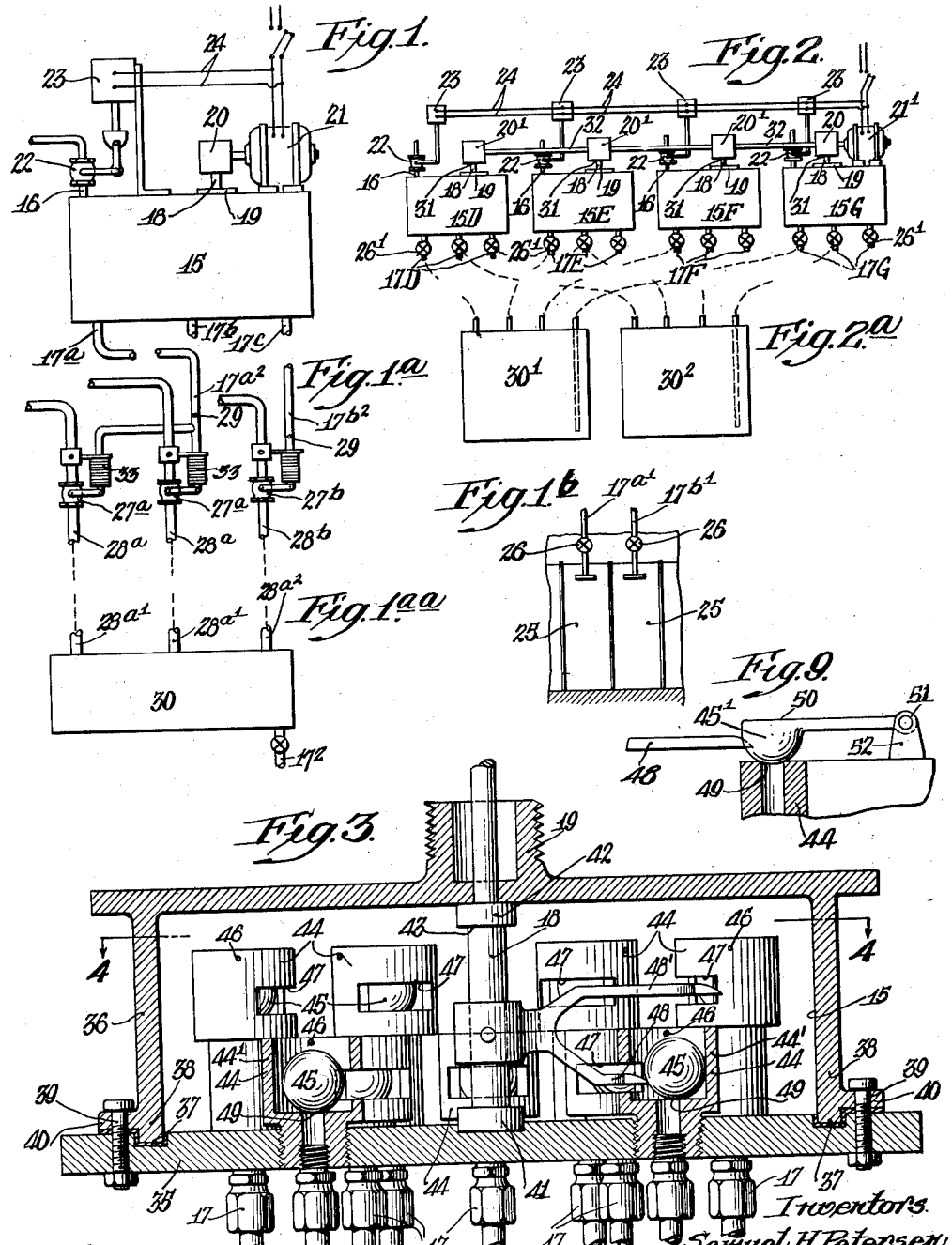

Patented Aug. 28, 1934

1,971,382

UNITED STATES PATENT OFFICE 1,971,382

MULTIPLE VALVE CONTROL

Samuel H. Petersen and Frank D. Petersen, Philadelphia, Pa.

Application March 5, 1932, Serial No. 597,012

7 Claims. (Cl. 137—145)

The present invention relates to mechanism for automatically controlling periodic flows of liquids, and that includes a fluid pressure supply box having an inlet connection to fluid pressure, valved outlets and rotating means for successively operating the valves, and some of the different individual features of the invention relate to the mixing of different liquids in definite proportions, to the optionally remote control of fluid pressure controlled valves, such as sylphon or piston valves, and to the automatic periodic deliveries of definite quantities of fluid to different points, for example for the periodically repeated automatic flushings of different urinals or the like.

A purpose of the invention is to provide novel mechanism of the character indicated adapted to easy and inexpensive manufacture and well suited to the needs of service.

A further purpose is to provide a fluid pressure distribution box with a rotating shaft, preferably vertical, and to locate a plurality of caged ball outlet valves at arcuate intervals around the shaft, for repeated successive displacements from their seats by a ball-engagement member mounted on the shaft and effecting displacement of each ball during its passage of the ball.

A further purpose is to use valves having opening bearing a relation to their height so that adjustment of the height of the valve may be made to vary the total extent or the length of time of opening or both.

A further purpose is to provide a fluid pressure supply box of the character indicated with a plurality of rows of ball outlet valves, the rows extending concentrically around a rotating shaft and the rows spaced from one another radially and preferably longitudinally of the shaft axis.

A further purpose is to provide a rotating shaft with a novel and desirable form of finger or cam for effectively controlling the operation of a ball valve member adapted to be displaced from its seat by the finger or cam in passing the member.

A further purpose is to determine the frequency of discharge at each valve outlet by the rate of rotation of the shaft and the duration of each discharge flow by the arcuate length of the lifting portion of the valve-operating member.

A further purpose is to automatically close off the inlet to a pressure distribution box of the character indicated if the rotation of the operating shaft stops.

A further purpose is to provide a form of valve seat for ball outlet valves of a pressure distribution box of the character indicated that will eliminate the chattering of the valves under the conditions of service within the box.

Further purposes will appear in the specification and in the claims.

We have elected to show a few only of the different forms of our invention, selecting forms however that are practical and efficient in operation and which well illustrate the principles involved.

Figure 1 is a diagrammatic elevation of structure embodying some of the principal features of the invention.

Figures 1ª and 1ᵇ are fragmentary views illustrative of two of many different structures that may be used with the structure of Figure 1.

Figure 1ᵃᵃ is a fragmentary view illustrative of one of many structures conveniently used with the structures of Figures 1ª and 1.

Figure 2 is a diagrammatic elevation of a desirable form of multiple distribution unit each of which may be closely similar to the corresponding unit in the structure of Figure 1.

Figure 2ª is a fragmentary view of mixing connections that may be used with the structure of Figure 2.

Figure 3 is a vertical section of a desirable form of fluid and pressure distribution and control mechanism, that may be considered as one embodiment of a unit intended to be shown conventionally in Figure 1 or/and as one embodiment of any one of several similar units of Figure 2.

Figure 4 is a horizontal section of Figure 3 taken upon the line 4—4 thereof.

Figure 4ª is a sectional plan view of a cup showing a slightly different form from that shown in the main figures.

Figure 4ᵇ is a sectional plan view of a somewhat variant construction of cup.

Figures 5 and 6 are differently modified fragmentary top plan views of a detail of Figure 4.

Figures 7 and 8 are vertical sections respectively on the line 7—7 of Figure 5 and on the line 8—8 of Figure 6.

Figure 9 is a fragmentary vertical section of a variant form of valve.

Like numerals indicate like parts in all figures.

Describing in illustration and not in limitation and referring to the drawings:—

In the diagrammatic lay-out of Figure 1 a fluid pressure distribution box 15 is provided with a fluid inlet pipe 16 and a plurality of outlets, designated generically by the numeral 17 and specifically by the numeral 17 and a reference letter. These outlets are opened to the box interior, preferably one at a time, successively by rotation of a shaft 18, with cooperating mechanism inside the box. The outlet valves, not shown in Figure 1, are adapted to be opened successively by mechanism mounted upon the shaft 18, above, which enters the box through a suitable gland 19 and is driven through reduction gearing 20 by any suitable means for which we have shown a small motor 21.

As illustrated, an inlet valve 22 in the fluid supply pipe 16 is operatively connected to the armature of a solenoid 23, so as to automatically open and close when the solenoid is respectively energized and de-energized.

The solenoid electrical connections 24 are connected across the terminals of the motor so that the solenoids and motor are in parallel to energize and to de-energize the solenoids simultaneously with the motor. As a result the inlet valve is closed whenever the motor is shut down and open whenever the motor is operating.

While usually the box interior may be connected to one only of the outlets 17 at a time during the normal rotation of the shaft 18, it will be understood the periods of discharge at any outlet may either overlap or coincide with the periods of discharge at one or more of the other outlets, according to dimensional selection of mechanism inside the box.

Among the more important applications of the fluid distribution box is the intermittently repeated deliveries of fluid to each one of a series of places at which the fluid may be needed and the intermittently repeated application of fluid pressure to each one of a series of devices controlled or operated by fluid pressure.

An important example of the first application and to which the device is particularly well suited is the automatic intermittently repeated flushings of each one of a series of urinals.

Thus the outlet pipes 17$^a$, 17$^b$, etc. are respectively connected to the pipes 17$^{a1}$, 17$^{b1}$, etc. delivering into the flush heads of a succession of urinals 25, Figure 1$^{b1}$. The inlet at 16 to the distribution box may comprise water suitably treated with disinfectants and delivering into the box at a rate that may be nearly uniform and need not be much greater at any time than the rate of flush delivery to a single urinal.

The flush deliveries at the individual urinals may be individually adjusted or temporarily cut off at suitable valves 26 without affecting the flushing operations at any of the other urinals, the valves 26 or 26' being in the individual delivery pipes beyond the distribution box, at the urinals or below the boxes.

An important example of the second application is the automatic intermittently repeated operation of each one of a series of valves or other individual pressure control devices.

For example, the outlet pipe 17$^a$, 17$^b$, etc. of the box 15 may be respectively connected to pipes 17$^{a2}$, 17$^{b2}$, etc., Figure 1$^a$, each of which may be connected to one or more piston, diaphragm or other valves 27$^a$ or 27$^b$ controlling fluid flow respectively in one or more pipes 28$^a$ and in one or more pipes 28$^b$.

In this arrangement each time rotation of the shaft 18 opens the interior of the box 15 to the pipe 17$^a$, the fluid pressure within the box is transmitted to the control valve or valves 27$^a$ of the pipe or pipes 28$^a$ to operate the valve or valves.

It will be understood the transmited pressure may either open or close the valve or valves as desired, and optionally may operate differently upon different valves controlled simultaneously by the fluid pressure in the pipe 17$^a$, the same pressure applied simultaneously to the two sylphon mechanisms then effecting a closing of one valve and an opening of the other valve, with valve reversals when the pressure releases.

When the shaft 18 of the distribution box progresses beyond the point at which the box interior is open to the pipe 17$^a$ the pressure at the two control valves is relieved, suitably, by a bleed opening 29 in the piping to the control valves. This results in a reversal of the valves opening or closing, according to the way in which the pressure control valves are adjusted.

One desirable arrangement permits an automatic control of the mixing of any number of different fluids successively at different mixing chambers by each one of any number of the outlet pipes 17.

In Figure 1$^a$ we have illustrated the facts not only that different liquids can be mixed by our mechanism but that they can be remotely controlled in the times during which the mixing takes place, and the actual facts of mixing. Moreover, they can be mixed at the same time that an outside liquid is being delivered at the same rate or a proportionate rate which does not enter into the mixing chamber such as the chamber seen in Figure 1$^{aa}$.

In Figure 1$^a$ an outlet connection such as 17$^a$ of Figure 1 is used to operate sylphon or other pressure valve controls 33 by which valves 27$^a$ are operated to admit liquids through pipes 28$^a$ which may enter the tank 30 by inlets 28$^{a'}$. The pipes 28$^a$ and 28$^{a'}$ here represent any outside pipes and may contain and control the admission of any liquids which are to be mixed with each other or which are to be mixed with a third liquid, such, for example, as that through pipe 28$^b$ controlled by pressure pipe 17$^{b2}$ through outlet 17$^c$. This third liquid where it is to be mixed with liquids in pipe 28$^a$ will enter the tank 30 through pipe 28$^{a2}$ but need not enter this tank at all. It can be controlled at the same time as liquids being mixed in the other pipes without being mixed with them, if desired.

The remote control shown for the fluid through pipe 28$^b$ in Figure 1$^{aa}$ may be used for any purpose, immediate or remote; as to control a liquid to operate a valve.

A plurality of the distribution boxes may be operated synchronously, and this arrangement is particularly advantageous when it is desired to obtain at different mixing chambers 30', 30$^2$ the same or different predetermined mixes of fluids adapted to deliveries from the different boxes.

A suitable lay-out for accomplishing this is illustrated in Figure 2 where the shafts 18 of mixing boxes 15D, 15E, 15F and 15G are operatively connected at 31 to a shaft 32 driven through reduction gearing 20' by a motor 21'.

Different fluids, herein conventionally designated D, E, F and G are delivered by the inlet pipes to the respective boxes for delivery directly from distribution boxes to the mixing chambers.

Thus different liquids D, E and F may be delivered during intermittent periods simultaneously from the pressure distribution boxes 15D, 15E and 15F out of outlet pipes 17D, 17E and 17F into a mixing chamber 30' and for a suitable period during or/and subsequent to the entry of the liquids D, E and F the liquor of the mix in the mixing chamber may be vigorously agitated by air or other gas delivered from the distribution box G through the pipe 17G.

The actual quantities of fluids from the different distribution boxes 15D, 15E, 15F and 15G are readily individually varied by adjusting valves 26' in the individual pipes to the mixing chamber.

It will be understood that there may be as many mixing chambers as there are outlets 17 from the individual pressure distribution boxes. Obviously, if desired, any of the outlets may be closed as at the valves 26' during the operation of the distribution mechanism, and without affecting the operation elsewhere than at the closed outlet.

If desired the supply valves to the individual distribution boxes may be closed and opened automatically by the opening and closure respectively of the motor circuit, as illustrated in Figure 1. This avoids any continued discharge through one or more of the outlets open to the box interior at the time of shut down.

Figures 3 and 4 illustrate a particularly desirable form of fluid distribution box that embodies a number of the desirable detail features of the present invention.

The illustrated box 15 includes a base plate 35 and a casing member 36 that is an inverted cup forming the sides and top of the box. The upper side of the base plate is annularly grooved at 37 to receive the downwardly directed edge 38 of the casing and the base and casing members are held together by bolts 39 at a rim 40 forming an integral part of the casing. The joint between the members may be made tight in any suitable way as by a gasket in the groove 37.

The shaft 18 for putting different outlets 17 successively into connection with the box interior is at the central axis of the casing and turns in bearings 41 and 42 respectively upon the base plate and upon the casing member.

The upper portion of the shaft is shown reduced at 43 to eliminate vertical play of the shaft and any leakage upwardly around the shaft is prevented by a suitable gland 19.

Preferably the inlet and outlet valves and connections are all in or supported by the base plate, in that this permits an easy opening and closure of the box by removal and replacement of the casing member without disturbing any of the valves or any of the piping to and from the box.

In Figure 1 the inlet 16 has been shown at the top of the box but as indicated in Figures 3 and 4 we prefer to have the inlet through the base plate and also prefer to provide the base plate with alternative inlets, as at 16$^a$ and 16$^b$.

This is advantageous sometimes to permit a more easy accommodation of the setting of the box to existing requirements as to piping or the like and also is advantageous if the box is to be used at different times for the dispensation of different fluids adapted to be delivered into the box at respectively different times at the respective inlets.

The outlet valve units are in one or more horizontal rows arcuate with respect to the shaft axis, all the valve units of any row being thus at substantially the same distance from the shaft axis.

We prefer to make the outlet valve units in the form of nipples 44 threading into the base plate from the upper side thereof. As illustrated the nipples are upwardly cupped to form valve seats and cages for ball valves 45.

The valve units are adjustable in height. This adjusts the height of the valve seats and the valve closures making it possible to equalize the outlet flow through the different units or to cause one or more units to have less or additional flow for the same character of valve actuation. This gives adjustment both of the extent of valve opening and of the time during which the valve is open, as will be seen from the description following. In order to permit exactness of adjustment of individual unit pipes we have made the external thread upon the lower part of the unit a fine thread.

The cups are provided with removable cross wires 46 to prevent upward escape of the balls and the cup sides are cut away at 47 toward the rotating shaft to permit a finger or cam 48 or 48' carried by the shaft to engage and, during the engagement, to displace the balls from their seats. Each ball returns to its seat as soon as the finger or cam passes, the came operating upon the balls, one after another.

The cut at 47 should be wide enough in vertical dimension to permit any adjustment of height of the cup which may be desirable and deep enough in its lateral extension to allow full play of the fingers 48 and 48'. All that is really required is that enough of a wall be left at 44' to support the top of a sealed cup so that the cut 47 may extend far beyond the center of the cup as seen in Figure 4$^a$.

To permit of adjustment of the angular position of the ball cup within a range of less than a turn, we may cut slots from both sides, as shown in Figure 4$^b$, leaving wall portions 44$^2$ to sustain the top of the cup. One or other of the opposite slots may be used as required.

We find the seats 49 presented to the balls 45 are preferably annular edges, the balls having then a freedom from chatter not readily obtainable under conditions of usual service of the seats present either flat or concave surfaces in contact with the balls.

The number of outlets will depend upon the number of points to which it may be deemed desirable to dispense fluid or fluid pressure from the box interior. The pressure within the box is transmitted through the valved connections. Where there is no appreciable pressure in the box the flow may be a gravity flow only.

Usually the dispensation of fluid or fluid pressure is to be substantially the same at the different points of use and, for this reason, the valve outlet units in one or more rows about the shaft are usually preferably alike in each row and uniformly spaced along each row. Desired differences in pressure may be accommodated by additional size of valve openings or displacement of the outlet so that the ball valve for this outlet will be allowed to remain open somewhat longer or not so long as the others. The difference in location of the outlet cups is not so desirable as the variation in the size of opening and in the height of the cup as these latter means of varying the flow do not interfere with regular spacing of the cups about the axis of revolution of the valve operating mechanism at equal distances from the axis.

Variation in the size of opening or the extent of valve opening may be desirable not only where differences of pressure or quantitiy of liquid are to be taken care of but where because of better frictional retardation—as by a longer distance of liquid transmission—additional opening may be required to secure the same delivery at the longer distance as is secured by the smaller or shorter time of opening and a shorter distance to the point of distribution.

We have preferred to locate the cages and the balls of the outer row in a horizontal plane above the cages and balls of the inner row and with the cages and balls of the outer row all at the same radial distance from the axis of rotation.

The arrangement of the valve seats and the valve ball closures in circular position at different heights is convenient though not essential and permits a box of comparatively small diameter to accommodate a large number of outlets by merely making the box a little deeper than would otherwise be required. The balls and cages in the two rows may be made exactly alike except that the stems of the upper row will be longer than the stems of the lower row. Any slight difference in time of opening due to the slightly larger radius of the arm operating the upper row or ball valves may be equalized by a difference in height adjustment of the cages—and, therefore, of the balls—with respect to the operating arms or by making the circumferential length of the operating arms where they engage the balls, longer to compensate for the slightly more rapid physical movement of the arms at these points of longer radius.

In order to indicate the means of adjustment of time of opening by circumferential extent of the opening finger we have shown two extremes in Figures 5 and 7 for the one form, and 6 and 8 for the other.

In Figure 5 the nose 48² of the arm 48 is of very short angular or circumferential extent with the result that the ball will be dropped very quickly after it has been raised by contact. This, of course, would apply equally to either arm 48 or arm 48'.

In Figures 6 and 8 the nose 48³—which is illustrated as on finger 48' but would as well operate on finger 48—is extended circumferentially so as to maintain the lifted position of the ball for quite an appreciably longer time than this lifting would be maintained by the nose 48².

The action of the finger may be purely one of pushing the ball valve away by engaging with it at some point near its vertical middle or may involve in its action more or less of a lifting operation where the finger engages the ball well below the middle of its height and tends to lift it as well as to push it or to lift it rather than to push it. The character of action depends both upon the height and upon the shape of the end of the finger.

It will be understood that the number of times the individual outlets are opened to discharge depends upon the rate of rotation of the shaft 18 and that the duration of the individual discharge at the individual outlets depends upon the arcuate length of the engagement member as well as upon the rate of rotation of the shaft.

If the frequency of the intermittent discharges has been predetermined, then the duration of each discharge is determined by a suitable selection of the arcuate length of the cam engagement member.

Cams of different lengths are illustrated in the different figures, thus in Figures 5 and 7 the cam is quite short; in Figures 6 and 8 relatively long, and in Figures 3 and 4 of an intermediate length, the choice of length depending upon the desired duration of discharge at each outlet.

While the type of valve in which the movable member is in the form of a ball is much superior to other forms, we may, if desired, partially restrain the movement of the ball, and in that case construct the movable member of the valve in partially spherical form as shown in Figure 9.

The effective seating surface of the valve in Figure 9 is the same as that in the other figures, but the reverse face of the ball 45' may be cut away, as indicated at 50, and the whole valve member is hinged at 51 from a rigid pivotal support 52.

The valve of Figure 9 is only an example of the variant forms of freely movable valve members which may be used, seating under pressure application and aided in seating by gravity.

It will be obvious that very excellent results are secured by the use of balls which are rolled laterally and lifted by the cam operation but that a considerable part of our invention may be secured by other valve elements similarly laterally shifted or/and raised.

In view of our invention and disclosure variations and modifications to meet individual whim or particular need will doubtless become evident to others skilled in the art, to obtain all or part of the benefits of our invention without copying the structure shown, and we, therefore, claim all such in so far as they fall within the reasonable spirit and scope of our invention.

Having thus described our invention, what we claim as new and desire to secure by Letters Patent is:—

1. A fluid distribution box having a rotatable shaft extending into the box interior, having a fluid inlet and a plurality of fluid outlets, valve seats about the outlets, balls on the seats, cages at the balls for limiting the ball displacements, the said balls being located in two rows thereof, differently spaced from and arcuate with respect to the shaft axis and differently positioned axially of the shaft, and arms on the shaft adapted to successively engage and displace the balls during the rotation of the shaft as the arms pass the successive balls.

2. A fluid distribution box comprising a plurality of ball valves and valve seats in different levels with respect to a shaft passing into the box and at different distances from the shaft in combination with means carried by the shaft for pushing the balls from their seats and restraining means for preventing undue movement of the balls.

3. In a fluid distributing system, a plurality of ball valves and ball valves seats arranged in a circle, nipples carrying the seats and having threaded adjustment as to height, a shaft at the center of the circle and means carried by the shaft for engaging the balls to move them from the seats, whereby the extent of valve opening is made adjustable by adjustment of the height of the nipples.

4. In a liquid distributing system, a liquid container, a shaft therein, an arm carried by the shaft, a ball valve and valve seat, therefor, adjustable as to height with respect to the arm and means for rotating the shaft, the arm being adapted to engage the ball to differing extents with different heights of ball seat adjustment.

5. A fluid distribution box having a rotatable shaft extending into the box interior, having a fluid inlet and two rows of fluid outlets, valve seats about the outlets, balls on the seats in inner and outer arcuate rows thereof differently spaced from and arcuate with respect to the shaft axis, cages at the balls for limiting the ball displacements, and arms on the shaft to successively engage and displace the balls of the respective rows during the rotation of the shaft, one arm successively engaging the balls of the inner row on the inwardly directed sides thereof and the other arm traveling over the tops of the cages of the balls of the inner row to successively engage the balls of the outer row.

6. A fluid distribution box having a rotatable shaft extending into the box interior, having a fluid inlet and a plurality of fluid outlets, valve seats about the outlets, balls on the seats, cages at the balls for limiting the ball displacements, the said balls being located in two rows thereof, the said two rows being concentric with the shaft and relatively spaced both radially and longitudinally of the shaft axis, and two vertically spaced arms on the shaft, the said arms operating respectively upon the balls of the respective rows.

7. In a fluid distributing system, a plurality of ball valves and ball valve seats arranged in a circle, nipples carrying the seats and having threaded adjustment as to height, a shaft at the center of the circle and means carried by the shaft for engaging the balls to move them from the seats, the means for engaging the balls being adjustable along the shaft and with respect to the balls, whereby the extent of valve opening of any individual valve is varied by adjustment of the height of the nipples and the extent of valve opening of all of the valves is varied by adjustment of the height of the arm on the shaft.

SAMUEL H. PETERSEN.
FRANK D. PETERSEN.